Oct. 20, 1936.　　　R. W. CLEMMONS　　　2,058,133
REEL
Filed July 1, 1935　　　3 Sheets-Sheet 1
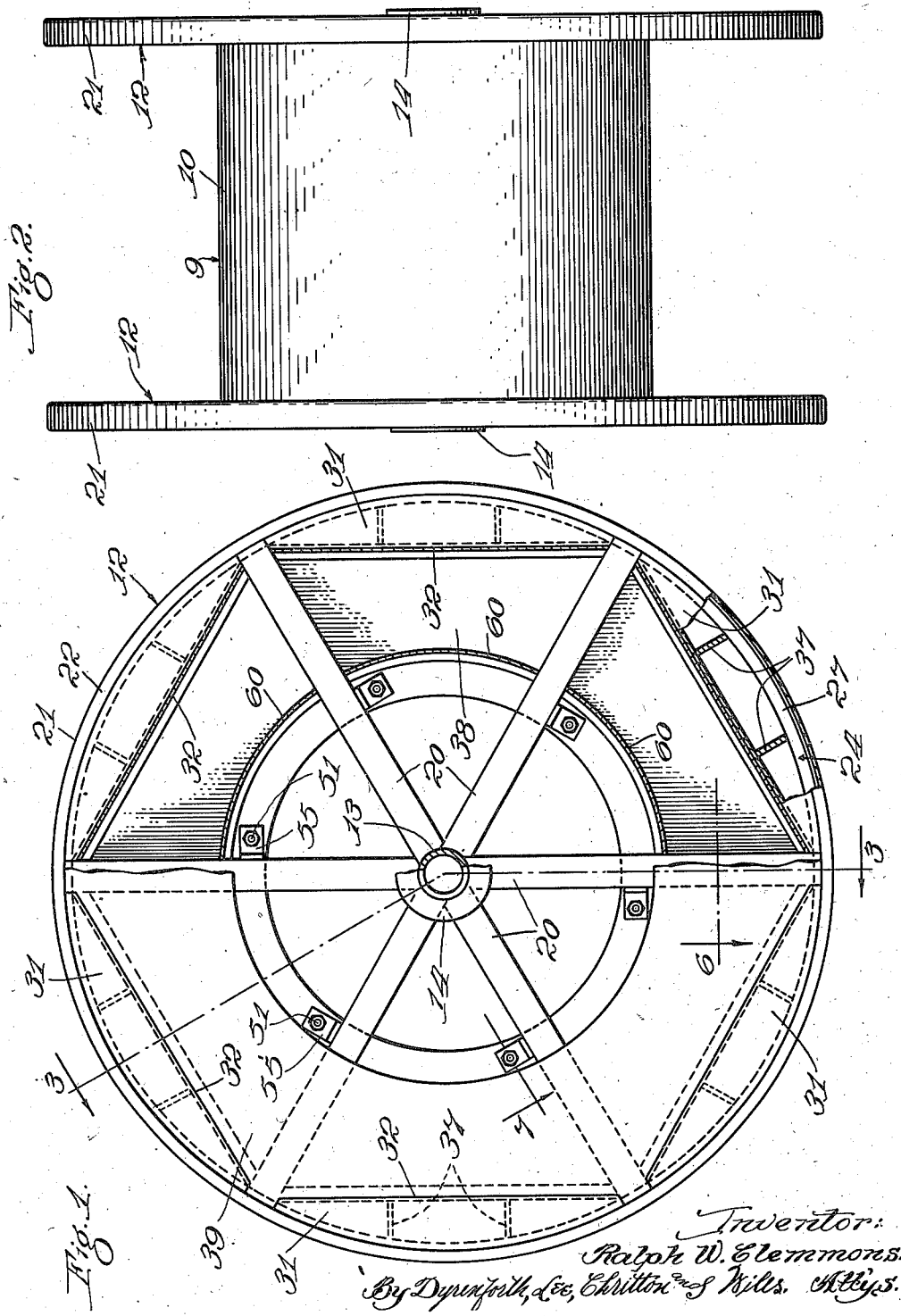

Oct. 20, 1936.  R. W. CLEMMONS  2,058,133
REEL
Filed July 1, 1935  3 Sheets-Sheet 2
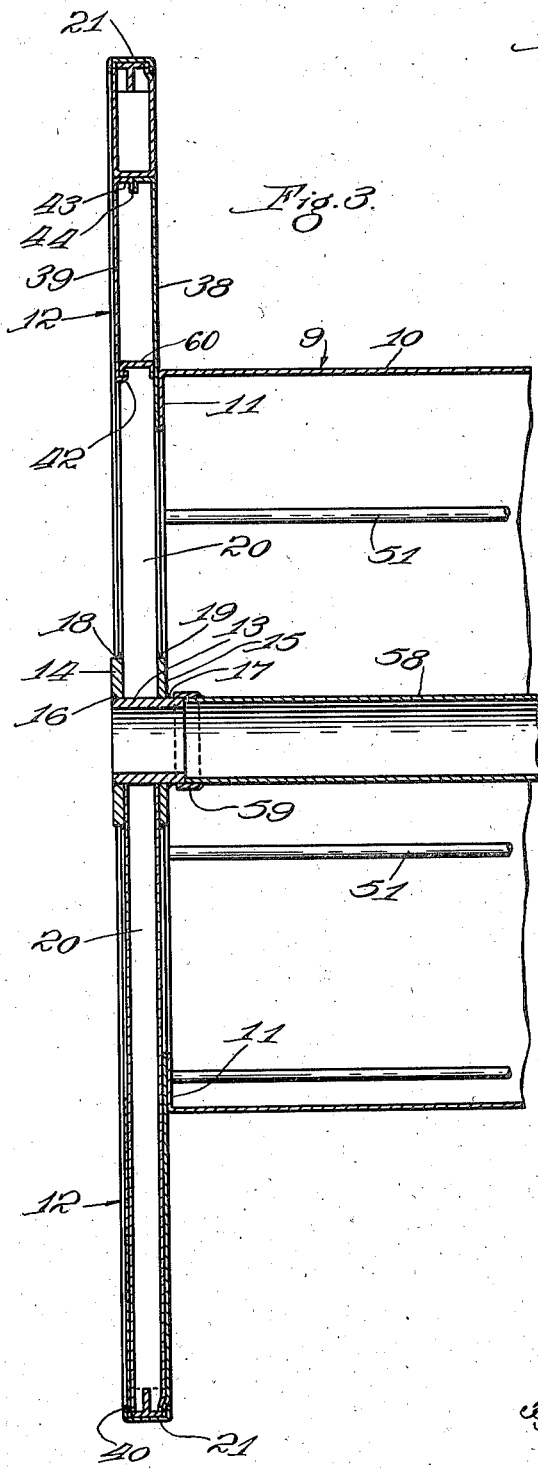
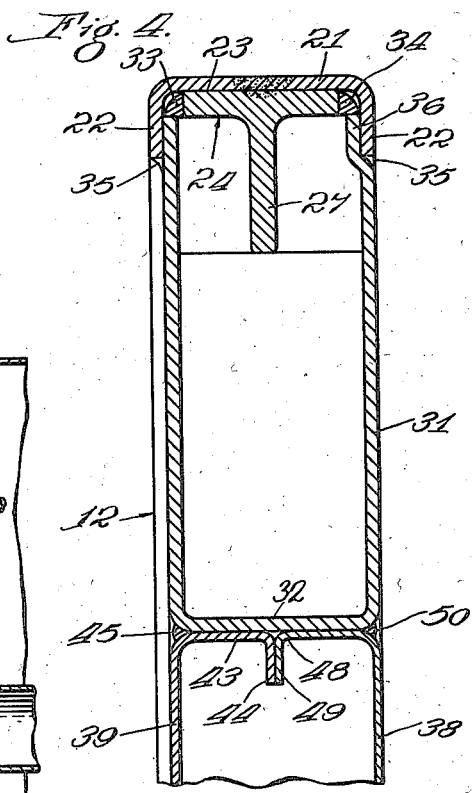
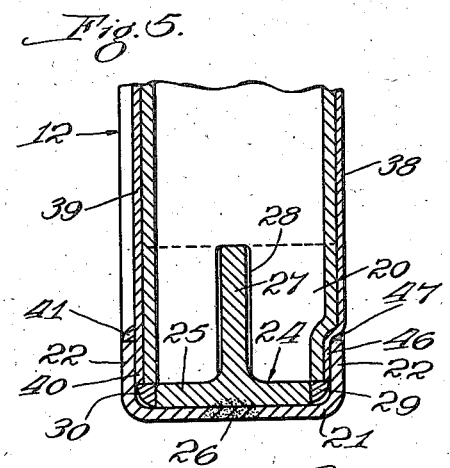
Inventor:
Ralph W. Clemmons,
By Dyrenforth, Lee, Chritton & Wiles
Attys.

Oct. 20, 1936. R. W. CLEMMONS 2,058,133
REEL
Filed July 1, 1935 3 Sheets-Sheet 3
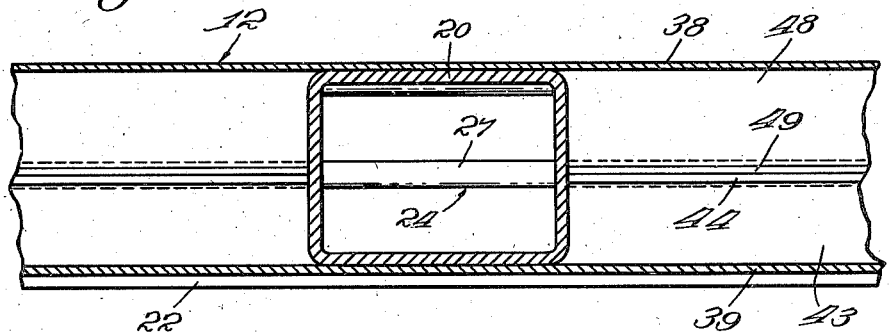
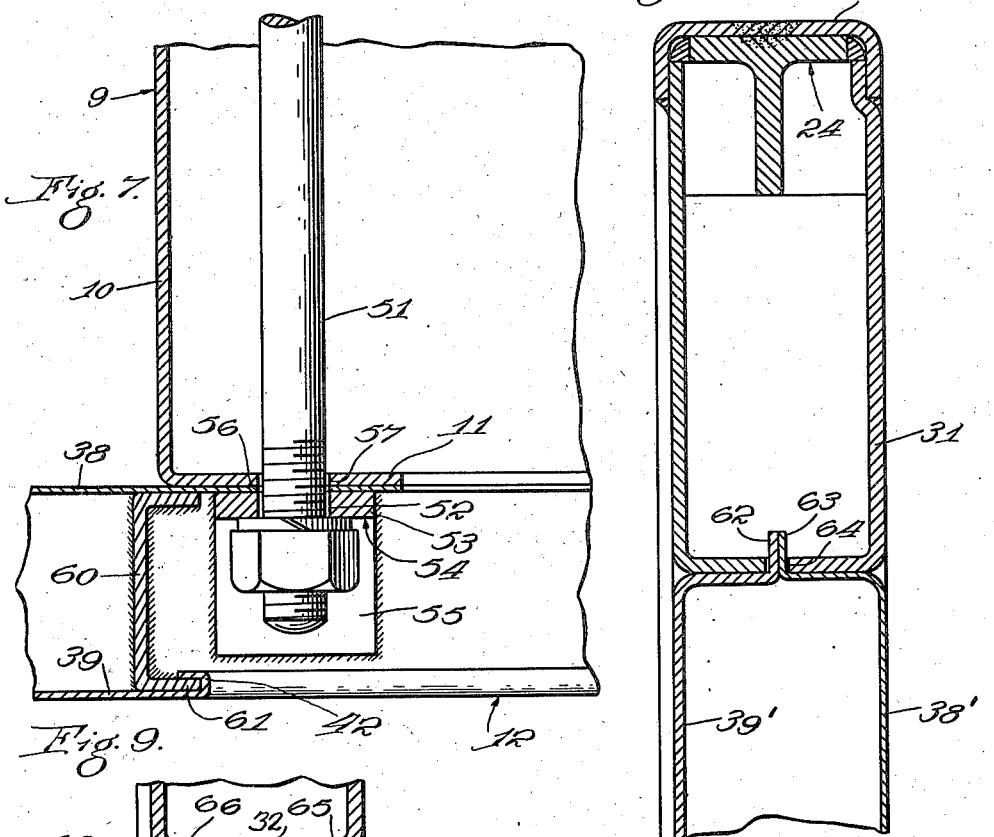
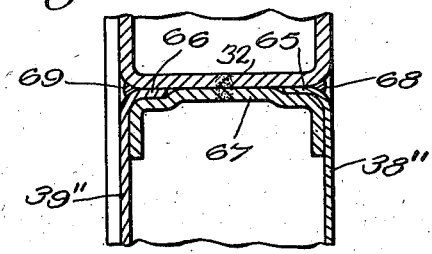

Patented Oct. 20, 1936

2,058,133

UNITED STATES PATENT OFFICE 2,058,133

REEL

Ralph W. Clemmons, Chicago, Ill., assignor to R. B. Hayward Company, a corporation of Illinois Application July 1, 1935, Serial No. 29,411

13 Claims. (Cl. 242—77)

My invention relates to metal reels provided, for example, for the winding thereon of electric cable, or the like.

Certain of my objects are to provide a construction which shall be strong, durable, simple, and economical of manufacture, of light weight, and the parts of which may be easily assembled; to provide a construction of reel-head which shall present a smooth outer surface to adapt the head for the stenciling thereon of printed matter to be displayed; and other objects as will be manifest from the following description.

Referring to the accompanying drawings:

Figure 1 is a view in end elevation of a reel constructed in accordance with my invention, a portion of the outer sheath (provided on each reel-head) being broken away to disclose interior details.

Figure 2 is a view in side elevation of the reel of Fig. 1.

Figure 3 is an enlarged section taken at the irregular line 3—3 on Fig. 1 and viewed in the direction of the arrows.

Figure 4 is an enlarged fragmentary view of the upper portion of the head structure shown in Fig. 3.

Figure 5 is a similar view of the lower portion of the structure shown in Fig. 3.

Figure 6 is an enlarged broken sectional view taken at the line 6 on Fig. 1 and viewed in the direction of the arrow.

Figure 7 is an enlarged broken sectional view taken at the line 7 on Fig. 1 and viewed in the direction of the arrow.

Figure 8 is a view like Fig. 4 of a modification of the structure therein shown; and Figure 9 is a broken view like Fig. 8 of still another modification.

Referring to the embodiment of my invention illustrated in Figs. 1 to 7, inclusive, the reel as shown comprises a hub portion 9 shown as formed of a drum 10 provided at its opposite ends with inwardly projecting flanges, the flange for one end of the drum being shown at 11.

The reel shown also comprises heads represented generally at 12 and each comprising a centrally located arbor tube 13 surrounded by spaced apart rings 14 and 15 continuously welded thereto as represented at 16 and 17, respectively.

Radiating from the arbor tube 13 and welded to the rings 14 and 15 as indicated at 18 and 19, respectively, are spokes 20 shown as of hollow sheet metal construction of general rectangular form.

The spokes 20 extend outwardly adjacent the tread of the head shown as formed of a ring 21 of channel shape in cross section and presenting continuous side flanges 22, with its channel 23 extending along its inner surface and opening toward the center of the head, and a reinforcing ring 24 of T-shape in cross section secured flatwise at its head portion 25 to the inner surface of the ring 21, as for example by continuously welding it thereto as indicated at 26, the flange portion 27 of the ring 24 extending inwardly and into slots 28 in the ends of the spokes 20.

The spokes 20 are welded at their outer ends to the reinforcing ring 24 at the welds represented at 29 and 30, the inner sides of the spokes at their outer ends being slightly offset as illustrated of the spoke shown in Fig. 5, a distance equal to the thickness of the adjacent flange 22 of the channel member 21.

Located in the several spaces between the spokes 20 at their outer ends, is a circumferential series of gussets 31 of general U-shape in cross section shown as straight along their inner edges represented at 32 and of arcuate shape at their outer edges along which latter the gussets are welded to the reinforcing ring 24 by the welds represented at 33 and 34. The gussets 31, which are welded at their ends to the adjacent spokes 20, fit within the side flanges 22 of the tread channel 21 to which they are welded as indicated at 35, the inner side walls of the gussets being offset from their outer marginal edges, as represented at 36, a distance substantially equal to the thickness of the adjacent side flange 22 of the channel iron 21.

By reference the gussets 31 are each provided at intervals with bracing plates 37 located in, and extending crosswise of, the channels of the gussets and secured in position therein in any suitable way.

The structure of head provided as described is of skeleton form comprising a hub, spokes, and a gusset-reinforced tread portion, it being my purpose in the designing of the reel for any given load, to figure these elements as taking all of the stresses to be resisted by the head structure.

It is desirable in constructions of this character that the inner and outer sides of the head be sheathed and that the outer sheathing be in such condition that it presents a smooth exposed outer surface to receive printing, as by stenciling it thereon. This is provided for in the particular construction shown by the inner and outer sheaths represented at 38 and 39, respectively, each shown as formed of a single sheath of metal, though this is not necessary.

The sheath 39 extends continuously over the spaces defined between the spokes and gussets and over the outer faces of the spokes, the portions thereof which extend along the spokes outwardly in a radial direction from the sides 32 of the gussets, and are represented at 40, being interposed between the spokes and the adjacent side flange 22 of the channel 21 to which they are welded as represented at 41.

The sheath 39 shown as provided in the form of a ring is spaced at its inner peripheral edge, (inturned at the portions thereof in registration with the spaces between the spokes, as indicated at 42), from the ring 14, thus causing the outer side of the head to be open as represented, though if desired the sheath 39 may be continued inwardly to the ring 14.

The outer marginal edge-portions of the sheath 39 are inturned between the spokes 20 along straight lines to provide angle shaped flanges 43 along these edges, the radial portions 44 of these flanges extending toward the axis of the device and the circumferential portions thereof secured to the adjacent surfaces of the gussets 31 as, for example, by tack welding these parts together, as represented at 45.

The inner sheath 38 is of the same construction as the sheath 39 except that it is shown as extending inwardly from the outer surface of the drum 10 to a point adjacent the inner edge of the flange 11 and is lacking a flange corresponding with the inturned edge 42. The portions of the sheath 38 represented at 46 and corresponding to the portions 40, are inwardly deflected to conform to the contour of the deflected end portions of the spokes 20 between which latter and the adjacent side flange 22 of the channel 21 they are interposed, the portions 46 being secured to the flange referred to, as by welding them together as represented at 47.

The angle shaped inwardly turned flanges on the straight edge portions of the sheath 38, are represented at 48, their radially extending flange portions 49 flatwise abutting the adjacent flanges 44 of the sheath 39, the sheath 38 being secured to the gussets 31 in any suitable way as, for example, by tack welding these parts together as represented at 50.

The heads 12 and drum 10 are shown as rigidly clamped together by means of a plurality of tie rods 51 which extend through openings 52 in the flanges 53 of angle lugs 54 secured at their other flanges 55 to the sides of adjacent ones of the spokes 20, these tie rods also extending through openings 56 in the inner sheath 38 and openings 57 in the flanges 11.

The structure shown includes a spacer tube 58 interposed between the arbor tubes 13 of the two heads and held against displacement by collars 59 on the tubes 13.

Located in the spaces defined by adjacent spokes 20 and between the sheaths 38 and 39 is a circumferential series of arc-shaped plates 60 forming bridging for the space between the sheaths 38 and 39 to reinforce the sheaths against distortion. The members 60 which are secured in place as by welding them at their ends to the spokes 20, are shown as of channel shape in cross section, the outer flanges 61 of these members extending into the grooves provided at the inturned edges 42 of the sheath 39.

As will be readily understood, the sheaths 38 and 39 may be made of relatively thin gauge material, the sheath 38, by preference, being of slightly thinner material than the sheath 39.

The construction shown in Figure 8 is the same as that shown in Figures 1 to 7, inclusive, except that instead of providing the inturned flange portions 44 and 49 on the outer and inner sheaths respectively, herein represented at 38' and 39' flatwise abutting radially outwardly extending flanges are provided thereon as represented at 62 and 63, these flanges extending through slots 64 in the gussets 31 which latter in this particular construction are each formed of two body sections spaced apart along their inner edges to provide the slots 64.

The construction shown in Figure 9 is the same as that shown in Figures 1 to 7, inclusive, except as to the manner of holding in place the sheaths corresponding to the sheaths 38 and 39 and herein represented at 38'' and 39''. In this construction the outer marginal portions of the sheaths are inturned as represented at 65 and 66, respectively, along straight lines, these inturned portions extending into grooves provided between the straight sides 32 of the gussets 31 and channel members 67 secured flatwise to the adjacent sides of the gussets, as, for example, by spot welding them thereto as represented, the inturned edge portions 65 and 66 being peripherally tack welded to the gussets as represented at 68 and 69 respectively.

While I have illustrated and described certain particular embodiments of my invention, I do not wish to be understood as intending to limit it thereto as the same may be variously modified and altered and the invention embodied in other forms of structure without departing from the spirit of my invention.

What I claim as new, and desire to secure by Letters Patent, is:

1. A head construction comprising a series of radiating spoke-forming members, a tread portion and a series of gussets interposed between said spokes adjacent said tread portion, said parts forming a skeleton wheel-like structure, and a sheath at one side of said structure having inturned flanges opposing those surfaces of the gussets which face toward the longitudinal axis of the head.

2. A head construction comprising a series of radiating spoke-forming members, a tread portion and a series of gussets interposed between said spokes adjacent said tread portion, said parts forming a skeleton wheel-like structure, and sheaths at opposite sides of said structure having inturned flanges opposing those surfaces of the gussets which face toward the longitudinal axis of the head.

3. A head construction comprising a series of radiating spoke-forming members, a tread portion and a series of gussets interposed between said spokes adjacent said tread portion, said parts forming a skeleton wheel-like structure, sheaths at opposite sides of said structure having inturned angular flanges portions of which are radial, certain portions of said flanges opposing those surfaces of the gussets which face toward the longitudinal axis of the head, and said radial portions of the flanges of opposed sheaths flatwise opposing each other.

4. A head construction comprising a series of radiating spoke-forming members, a tread portion and a series of gussets interposed between said spokes adjacent said tread portion, said parts forming a skeleton wheel-like structure, and a sheath at one side of said structure having inturned flanges opposing those surfaces of the gussets which face toward the longitudinal axis of the head, said sheath and gussets being welded together along adjacent edges.

5. A head construction comprising a series of radiating spoke-forming members, a tread portion and a series of gussets interposed between said spokes adjacent said tread portion, said parts forming a skeleton wheel-like structure, sheaths at opposite sides of said structure having inturned angular flanges portions of which are radial, certain portions of said flanges opposing those surfaces of the gussets which face toward the longitudinal axis of the head, and said radial portions of the flanges of opposed sheaths flatwise opposing each other, said sheaths and gussets being welded together along adjacent edges.

6. A head construction comprising a series of radiating spoke-forming members, a tread portion and a series of gussets interposed between said spokes adjacent said tread portion, said parts forming a skeleton wheel-like structure, sheaths at opposite sides of said structure having inturned angular flanges portions of which extend radially toward the longitudinal axis of the head, certain portions of said flanges opposing those surfaces of the gussets which face toward said axis and said radial portions of the flanges of opposed sheaths flatwise opposing each other.

7. A head construction comprising a series of radiating spoke-forming members, a tread portion and a series of gussets interposed between said spokes adjacent said tread portion, said parts forming a skeleton wheel-like structure, sheaths at opposite sides of said structure having inturned angular flanges portions of which extend radially toward the tread of the head and into the gussets, certain portions of said flanges opposing those surfaces of the gussets which face toward the longitudinal axis of the head.

8. A head construction comprising a series of radiating spoke-forming members, a tread portion and a series of gussets interposed between said spokes adjacent said tread portion, said parts forming a skeleton wheel-like structure, and a sheath at one side of said structure having inturned flanges, said gussets having grooves into which said flanges extend.

9. A head construction comprising a series of radiating spoke-forming members, a tread portion and a series of gussets interposed between said spokes adjacent said tread portion, said parts forming a skeleton wheel-like structure, and sheaths at opposite sides of said structure having inturned flanges, said gussets having grooves into which said flanges extend.

10. A head construction comprising a series of radiating spoke-forming members, a tread portion and a series of gussets interposed between said spokes adjacent said tread portion, said parts forming a skeleton wheel-like structure, and a sheath at one side of said structure having inturned flanges, said gussets having grooves into which said flanges extend, said sheaths and gussets being welded together.

11. A head construction comprising a series of radiating spoke-forming members, a tread portion and a series of gussets interposed between said spokes adjacent said tread portion, said parts forming a skeleton wheel-like structure, and sheaths at opposite sides of said structure having inturned flanges, said gussets having grooves into which said flanges extend, said sheaths and gussets being welded together.

12. A head construction comprising a series of radiating spoke-forming members, a tread portion and a series of gussets interposed between said spokes adjacent said tread portion, said parts forming a skeleton wheel-like structure, and a sheath provided at one side of said skeleton structure having portions in registration with the outer ends of said spokes and extending between the latter and said tread member, said sheath having inwardly extending flanges which oppose those surfaces of the gussets which face toward the longitudinal axis of the head.

13. A head construction comprising a series of radiating spoke-forming members, a tread portion, a sheath of ring form at one side of said head, the marginal edge of said ring at the opening therein being flanged to form grooves, and a series of members for preventing distortion of said sheath located in the spaces between said spokes, said last-named members having flanges extending into said grooves.

RALPH W. CLEMMONS.